United States Patent
Kimberling

[15] 3,643,719
[45] Feb. 22, 1972

[54] CONVEYING AND STACKING APPARATUS FOR BAKED GOODS

[72] Inventor: Garland W. Kimberling, R.R. 2, Metamora, Ill. 61548

[22] Filed: June 29, 1970

[21] Appl. No.: 50,433

[52] U.S. Cl....................146/98, 53/159, 83/79, 83/91, 198/35
[51] Int. Cl........................................B26d 1/14
[58] Field of Search.............198/35; 53/159, 123; 83/79, 83/86, 87, 96, 91; 146/98

[56] References Cited

UNITED STATES PATENTS

| | | | |
|---|---|---|---|
| 2,815,848 | 12/1957 | Jones | 198/35 |
| 3,106,048 | 10/1963 | Marasso et al. | 53/123 |

Primary Examiner—Willie G. Abercrombie
Attorney—Polachek & Saulsbury

[57] ABSTRACT

A portable wheeled frame is positioned between an oven and a packaging table in a bakery. The frame carries two motor-driven conveyor belt systems. One system includes a broad belt extending in a substantially horizontal plane and carrying two rows of aligned baked goods. The second system includes two narrow belts positioned alongside the broad belt and which are inclined downwardly at their terminal ends. Each narrow belt carries a single row of like baked goods. The baked goods carried on the broad belt actuate a switch to drive a stacking chain carrying hook members. Each hook member travels in a plane transverse to the path of travel of the baked goods and displaces two of the aligned baked goods items from the broad belt to a position wherein each is stacked above the corresponding baked goods items on one of the narrow belts. A pair of circular saw blades are secured to a forward shaft which drives the pulleys. The saw blades separate the baked goods items so that they are positioned on their appropriate belts.

10 Claims, 11 Drawing Figures

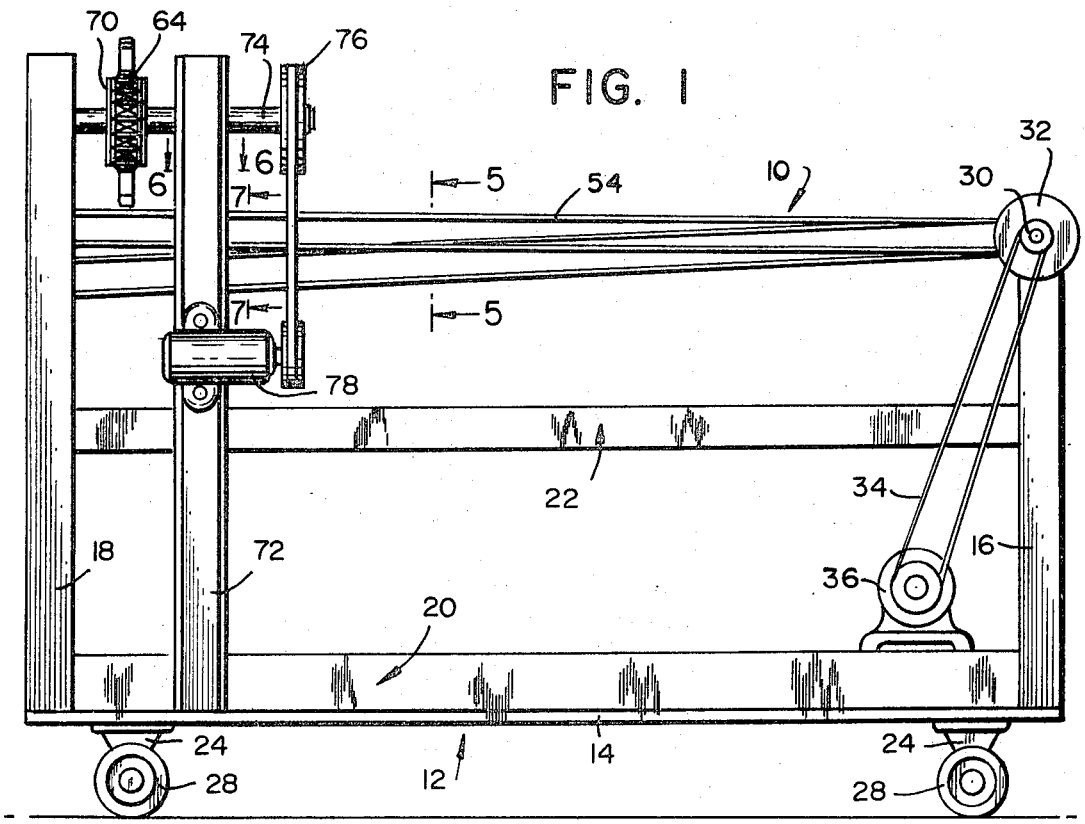
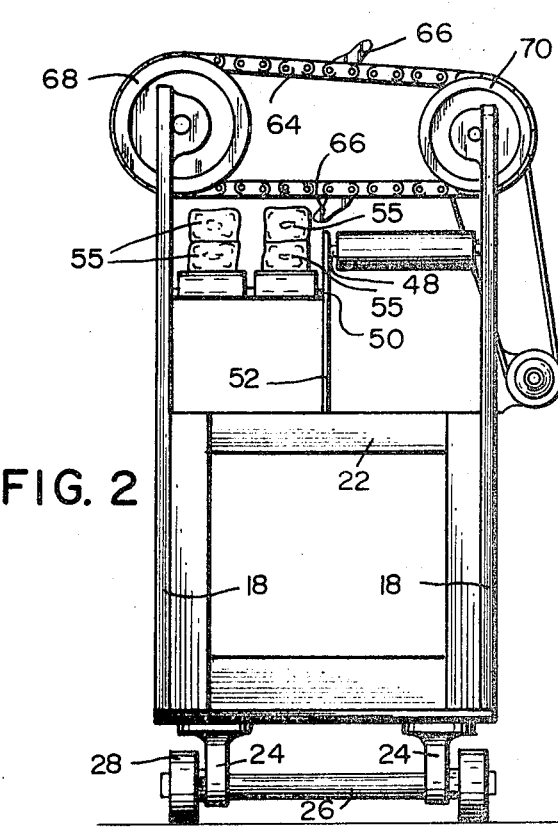

INVENTOR.
GARLAND W. KIMBERLING
BY
*Polachek & Saulsbury*
ATTORNEYS

INVENTOR
GARLAND W. KIMBERLING
BY
Polachek & Saulsbury
ATTORNEYS

CONVEYING AND STACKING APPARATUS FOR BAKED GOODS

The present invention deals with operations in a commercial bakery of the size which manufactures baked goods in large quantities and then subsequently package the baked goods for retail distribution. Generally such bakeries manufacture baked goods of relatively small size, e.g., buns, muffins, rolls, scones, biscuits, etc., in addition to baked goods of larger size such as bread, cakes, pies, etc. This invention is more particularly concerned with the conveying and stacking of the baked goods of smaller size in preparation for retail packaging.

Once the baked goods to which this invention applies leave the baking oven, they must be cooled for a period of time sufficient to prevent detrimental effects which would result if they were packaged immediately. In addition to the cooling requirement, it has been found that it is most advantageous to package these small baked goods in packages such that they are stacked with at least one lower level of baked goods placed alongside one another and a second level of goods placed on top of the first level.

There presently exists a need for a mechanized apparatus suitable for stacking such baked goods and further providing a means whereby the baked goods are permitted to sufficiently cool to preclude damage due to stacking and packaging.

One problem encountered with existing machinery presently in use for stacking baked goods in a packaging operation is the fact that such machinery is extremely complicated, cumbersome, and frequently in need of repair, thus necessitating a reduction in bakery output and, furthermore, they are inherently immobile, thus precluding easy replacement with a standby device during repair.

A further disadvantage brought about by the immobility of present stacking machinery is the fact that they may not be moved from one work area in the bakery to an alternate work area, thus separate stacking machinery is generally required for each baking oven although not all baking ovens are in operation at the same time.

It is an object of the present invention to provide a bakery conveying and stacking apparatus of the general character described which is so constructed that it is not subject to any of the foregoing disadvantages.

A further object of the present invention is to provide a bakery conveying and stacking apparatus which is simple in construction, easy to maintain, durable, yet can be manufactured at a cost appreciably less than prior devices designed to serve the same function.

Yet another object of the present invention is to provide a bakery conveying and stacking apparatus of the general character described which may be moved about a bakery area to facilitate the packaging of baked goods which are baked in any one of a plurality of ovens.

Another object of the present invention is to provide a bakery conveying and stacking apparatus of the general character described which includes two conveyor belt systems for carrying baked goods with a portion of one of the systems at an elevation lower than the corresponding portion of the other system and means for transferring baked goods from the other system the one system thereby stacking the baked goods.

A further object of the present invention is to provide a bakery conveying and stacking apparatus of the general character described which includes means for transferring baked goods from one conveyor belt system to another conveyor belt system wherein the baked goods transferred are stacked upon baked goods carried on the other conveyor belt system.

Yet another object of the present invention is to provide a bakery conveying and stacking apparatus of the general character described which includes a switch to actuate a baked goods stacking apparatus which switch is triggered by baked goods being carried along a conveyor system.

Further objects of the invention in part will be obvious and in part will be pointed out hereinafter.

The invention accordingly consists in the features of construction, combinations of elements and arrangements of parts to be exemplified in the conveyor system and stacking apparatus hereinafter described and of which the scope of application will be indicated in the appended claims.

In the accompanying drawings, in which are shown some of the various possible embodiments of the invention, FIG. 1 is a side elevational view of a conveying and stacking apparatus constructed in accordance with and embodying the invention, and showing two conveyor belt systems extending along the length of the apparatus and driven by a motor with a stacking device positioned adjacent the discharge end of the conveyor systems and operable to stack baked goods carried on one of the systems atop the baked goods carried on the other system.

FIG. 2 is a discharge end elevational view of the apparatus showing both conveyor systems along with the stacking apparatus and a driving motor for the stacking apparatus.

FIG. 3 is a front loading end elevational view of the apparatus with portions deleted for clarity and showing the driving motor for the conveying systems.

Figure 4:
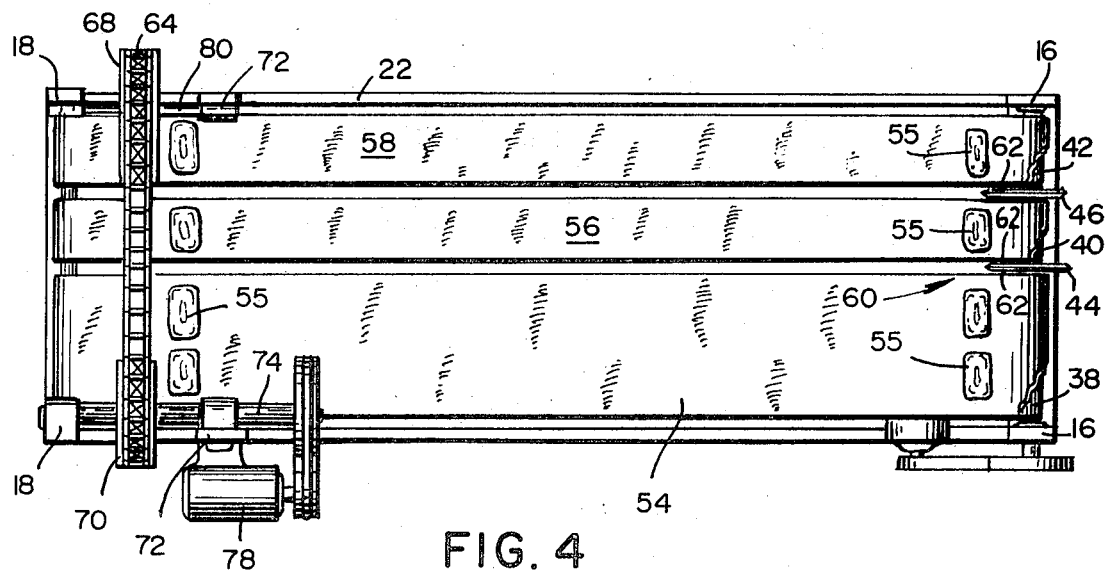
FIG. 4 is a top plan view of the apparatus.
Figure 5:
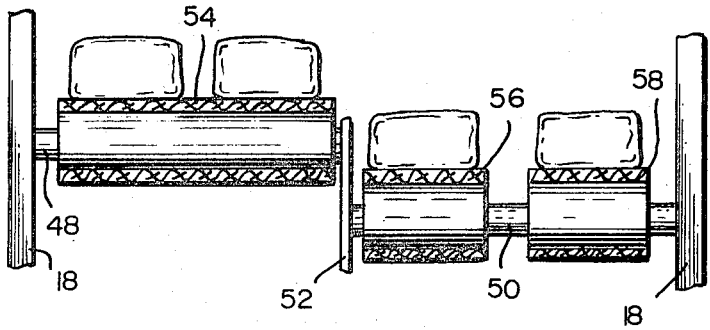
FIG. 5 is an enlarged fragmentary sectional view through the conveyor belt systems taken substantially along the line 5—5 of FIG. 1.

Referring now in detail to the drawings, the reference numeral 10 denotes a conveying and stacking apparatus constructed in accordance with and embodying the invention. The apparatus 10 includes a frame 12 including a substantially flat rectangular baseplate 14. At a forward end of the baseplate 14 a pair of columns 16 are positioned. The columns 16 are mounted on the corners of the baseplate and are preferably formed of a steel channel. Similarly at the rear end of the baseplate 14 two columns 18 are positioned and mounted on the corners. The columns 18 are also formed preferably of a steel channel. A rectangular base subframe 20 joins the columns at their lower ends and is additionally mounted on the baseplate 14.

The frame 12 additionally includes a subframe 22 which is also rectangular in configuration and is secured to the columns 16, 18 at their approximate mid height. The subframes 20, 22 maintain the columns 16, 18 substantially vertical and rigidify the entire structure of the frame 12.

It should be noted that a flange 24 projects downwardly from the baseplate 14 adjacent each corner thereof an axle 26 is rotatably journaled through registered openings of flanges 24. A wheel 28 is secured to each axle adjacent the ends thereof. This wheeled axle arrangement permits great mobility in the apparatus 10 thus enabling the device to be moved about in a bakery thereby enabling the device to be utilized in various work areas, and in conjunction with the unloading and stacking of baked goods which are produced in any one of a number of ovens.

In accordance with the invention two endless conveyor belt systems are carried between the front columns 16 and the rear columns 18. Both conveyor belt systems are driven through a common axis which in fact is a rotatable shaft 30. The shaft 30 is journaled for rotation through openings adjacent the upper ends of the columns 16 and lies in a generally horizontal axis. A pulley 32 extends beyond one of the columns 16 and is engaged by an endless belt 34 which in turn is driven by a drive pulley extending from the shaft of a driving motor 36. When the motor 36 is actuated it causes rotation of the pulley 32, thus rotating the shaft 30.

The shaft 30 includes a plurality of enlarged cylindrical sections. A first cylindrical section 38 (see broken away portions of FIGS. 3 and 4) is positioned adjacent one of the columns 16 and is of a length slightly less than one-half the distance between the columns 16. The shaft 30 also includes two narrower cylindrical sections 40, 42 which are spaced from the broad cylindrical section 38 and from each other.

It should be additionally noted that a pair of circular sawblades 44, 46 are secured to the shaft 30 lying in a plane perpendicular to the axis of the shaft and are spaced between the broad cylindrical section and the narrow cylindrical section 40 adjacent thereto and additionally between the two narrow cylindrical sections 40, 42 respectively. The purpose of the circular sawblades will be subsequently described.

At the opposite terminal portions of the conveyor system two separate shafts 48, 50 are used in association with the broad and narrow cylindrical sections respectively. It should be initially observed that the axes of the shafts 48, 50 lie at different elevations with the axis of the shaft 48 in the same horizontal plane as the shaft 30 and the axis of the shaft 50 at an elevation below that of the shaft 30. The shafts 48, 50 are journaled at one of their ends through the columns 18 and at their other end through spaced openings in a strut member 52 projecting upwardly from the subframe 22 and lying within a vertical plane passing between the columns 18. Each of the shafts 48, 50 includes enlarged cylindrical sections corresponding to those on the shafts 30.

As was previously mentioned, the apparatus 10 includes two endless conveyor belt systems. The first endless conveyor belt system includes a broad endless belt 54 which is drawn between the broad cylindrical sections. The belt 54 lies substantially within a horizontal plane and the upper surface thereof moves in a path of travel from the columns 16 towards the columns 18 and carries thereon a plurality of baked goods.

A second conveyor belt system includes two narrow endless conveyor belts 56, 58 which are drawn between the narrow cylindrical sections 40, 42 and their corresponding cylindrical sections on the shaft 50 respectively. Due to the difference in elevation of the shafts 30, 50 the narrow belts 56, 58 run along a downward incline between the columns 16 at the front of the apparatus 10 and the columns 18 at the rear thereof. The first conveyor system including the broad belt 54 is designed to carry a double row of baked items 55, e.g., rolls, biscuits, buns, muffins, etc., from an oven. The oven preferably includes a conveyor feeding system which feeds the baked items 55 to the belt 54. Additionally, each of the narrow belts 56 58 is designed to carry a single row of baked items 55 from the oven. Usually the baked goods items 55 leave the oven in a matrix or series. The series leaving the oven for which the present apparatus 10 is designed in a series including a course of four items 55 which are usually interconnected adjacent their lower portions. The course extends in a direction perpendicular to the paths of travel of the belts.

In order to separate the series of four items 55 so that individual single rows of items 55 will be carried on the narrow belts and a double row of items 55 will be carried on the broad belt, a parting device 60 is provided. The parting device 60 includes the two circular sawblades 44, 46 previously described. The blades 44, 46 are relatively thick and rotate in unison with the shaft 30. It will be observed that when a series of baked goods items is delivered at the forward end of the apparatus 10, the rotating blades 44, 46 cut the series into a twin row of buns which is deposited on the moving broad belt 54 and single rows which are deposited on the narrow belts 56, 58.

In order to further insure that the baked goods items are properly separated, an annular spacer 62 is secured to each face of each blade. The spacer 62 is in abutting contact with the adjacent cylindrical portions and includes a tapered edge leading from the outer surface of each spacer to the respective blade face. The tapered edges of the spacers further serve to separate the baked goods items, thereby insuring proper seating of the items on the appropriate belts.

The conveying and stacking apparatus of the present invention additionally includes a device for stacking the baked goods items carried on the broad belt 54 on top of the baked goods items carried on a narrow belt. The stacking device includes an endless sprocket chain 64 having a plurality of hooks 66 which urge baked goods items 55 from the broad belt to the narrow belt. The sprocket chain 64 includes a plurality of hingedly pined links and is secured between two toothed wheels 68, 70 which lie in a vertical plane perpendicular to the paths of travel of the belts 54, 56 and 58.

In order to support the toothed wheels and hence the stacking device, a stud 72 is secured to opposite sides of the sub frames 20, 22 adjacent yet spaced from the columns 18 with each of the studs extending in a direction parallel to the columns 18 and having a length approximately the same as the columns 18. An axle 74 is journaled for rotation between the column 18 and the stud 72, and with the toothed wheel 70 secured to the axle. It should be additionally noted that the axle 74 extends beyond the stud 72 and adjacent the end of the axle, a pulley 76 is mounted. The pulley 76 is driven by a motor 78 mounted on the stud 72. A belt drive is positioned between the pulley and the motor. On the opposite side of the apparatus 10, an axle 80 is journaled for rotation between the corresponding column 18 and stud 72. To this axle the toothed wheel 68 is secured.

Returning again to the sprocket chain 64, arcuate hooks 66 are secured to one individual link thereof. The hook 66 travels in a generally horizontal plane along the bottom portion of the course of the chain.

It will be appreciated that the hook 66 extends a distance to engage the baked goods items 55 carried on the broad belt 54, and urges them across and on top of the baked goods items 55 carried on the narrow belts 56, 58 thereby resulting in a stacking operation. After the stacked baked goods items 55 pass the stacking device, they are delivered to a packaging area.

If a quantity of baked goods are continuously issuing from a conveyor delivery system within an oven and are deposited on to the first and second conveyor system of the present invention, the driving motor 36 of the conveyor system is operating at a rate such that by the time the baked goods reach the stacking area of the device 10 they have cooled sufficiently to preclude damage due to stacking and subsequent packaging.

Furthermore, the motor 78 runs at a speed such that the hooks 66 move to accommodatingly contact and stack each course of the baked goods items on the belt 54, as each pair of baked goods items forming a course in the double row carried on the broad belt passes the stacking means, a hook 66 contacts the baked goods and stacks them on the associated baked goods carried on the narrow belt.

Figure 6:
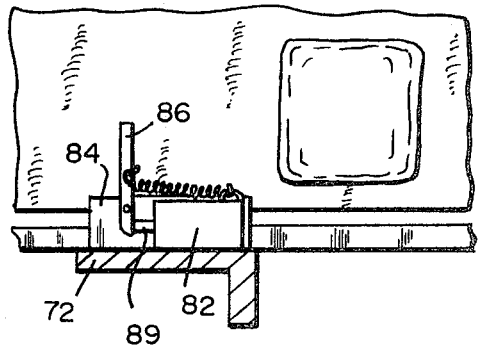
FIG. 6 is an enlarged fragmentary sectional view of the switching mechanism for the stacking, the same being taken substantially along the line 6—6 of FIG. 1.
Figure 7:
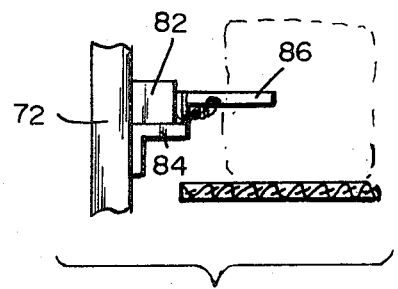
FIG. 7 is an enlarged fragmentary sectional view, the same being taken substantially along the line 7—7 of FIG. 1 and showing the switching mechanism.
Figure 11:
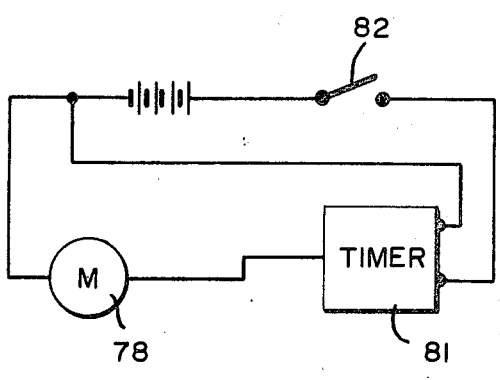
FIG. 11 is a simplified schematic illustration of a switching mechanism control for the stacking device.

Alternatively the present invention includes means whereby the stacking device may be intermittently operated by the baked goods items 55 themselves if the baked goods are not issuing from the oven in a continuous stream. This actuating means (see FIGS. 6, 7 and 11) includes a switch 82 (normally open) mounted to a plate 84 which extends from the inner face of the stud 72 to which the motor 78 is mounted. A strip lever 86 is pivotally mounted to the plate 84 and a portion thereof extends into the path of baked goods items being carried on the broad belt. When a baked goods item 55 passes the trip lever 86, the lever rotates, forcing a triggering element 89 of the switch 82, thereby actuating a circuit which powers the motor 78. A return spring 88 returns the lever 86 to its normal position after the baked goods items have passed the lever 86. The circuitry 82 includes a timer 81 triggered by the switch 82 which provides a timed duration in which the motor 78 operates and then resets itself. The timed duration of motor operation is sufficient to move a hook 66 a distance sufficient to stack a single course.

Figure 8:
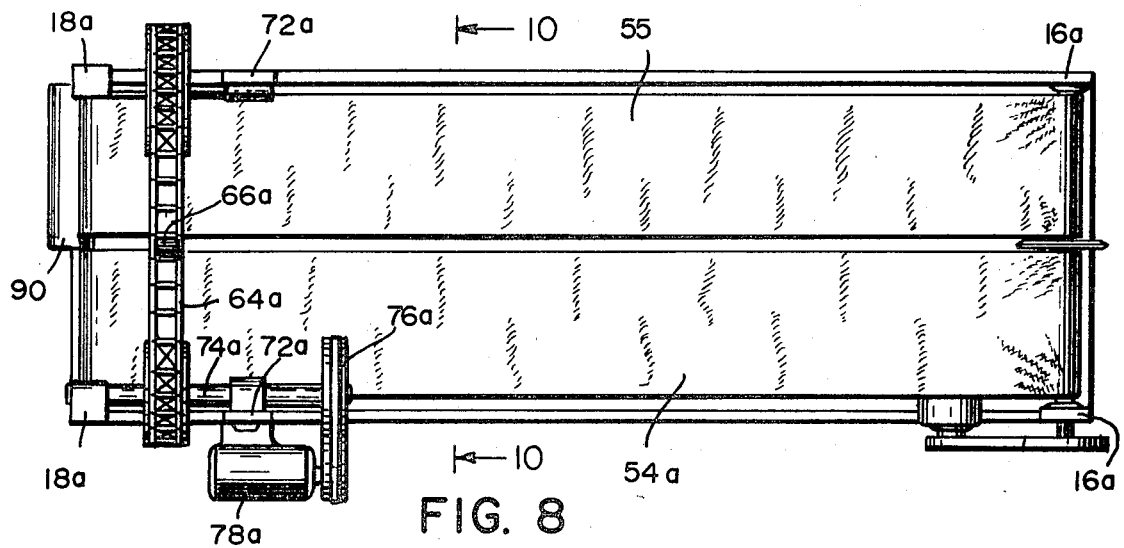
FIG. 8 is a top plan view of a further embodiment of the apparatus.
Figure 9:
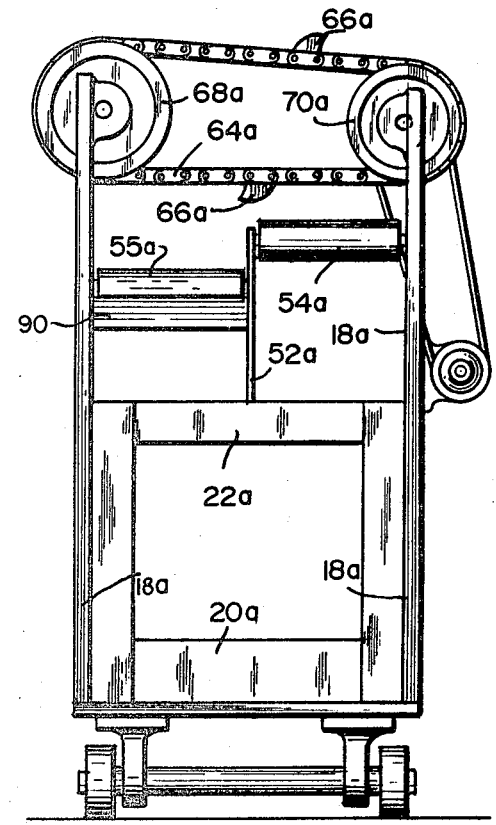
FIG. 9 is a discharge end elevational view of the apparatus illustrated in FIG. 8.
Figure 10:
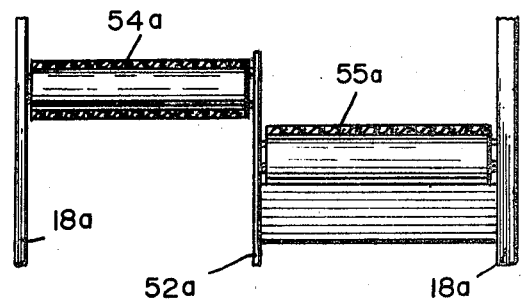
FIG. 10 is an enlarged fragmentary sectional view taken substantially along the line 10—10 of FIG. 8.

In an alternate embodiment of the invention as illustrated in FIGS. 8-10 wherein like numbers including the suffix "a" designate like parts in the previous embodiment the two conveyor systems both include broad belts 54a and 55a. The broad belt 54a is identical in structure and operation to the broad belt 54 previously described, and the broad belt 55 is a single belt which replaces the narrow belts 56, 58 thereby relieving the necessity of including a second circular saw.

This embodiment also includes a discharge chute 90 secured between the columns 18a and 52a and being downwardly inclined to discharge the stacked baked goods to a packaging station.

In all other respects this embodiment is identical to the previous embodiment and in operation each of the broad belts 54a, 55 carries twin rows of baked goods and a stacking device transfers a course of two adjacent baked goods items forming a part of the twin row on the broad belt 54a to associated baked goods items on the broad belt 55.

It can be seen that the conveying system and stacking apparatus of the present invention is simple in operation, sturdy, durable, easily transportable for various applications in a single bakery and provides a sanitary means for stacking baked goods items so that they may be subsequently packaged while additionally insuring that sufficient time has elapsed for proper cooling of the baked goods prior to packaging, thereby eliminating possible damage to the baked goods.

Thus it will be observed that there is provided a conveying and stacking apparatus which achieves the various objects of the invention and which is well suited to meet the conditions of practical use.

What is claimed is:

1. A conveying and stacking apparatus for baked goods, said apparatus comprising a first conveyor belt system, means moving the first conveyor belt system, the first system having a path of travel lying along a first plane and being adapted to transport baked goods from an oven along said path of travel, a second conveyor belt system, means moving the second conveyor belt system, the second conveyor belt system having a path of travel extending along a second plane, the second plane being inclined with respect to the first plane, the second conveyor belt system carrying baked goods from the oven along its path of travel, the first plane and the inclined second plane intersecting at a line perpendicular to the paths of travel, a baked goods stacking device, the device including an endless member, a protuberance projecting from the endless member, means moving the endless member in a path so that the protuberance contacts baked goods on the first conveyor system and moves said last-mentioned baked goods in a direction substantially perpendicular to the path of travel of the first conveyor belt system, the last mentioned baked goods being urged by the protuberance to a position wherein it is stacked on top of baked goods carried on the second conveyor belt system, the path of the endless member laying adjacent the path of the conveyor belt systems at a point rearwardly along the path of travel of the line of intersection of the planes, the means moving the conveyor belt systems moving the systems at a rate of speed sufficient to allow suitable cooling of the baked goods to prevent injury during stacking whereby the baked goods are automatically stacked and carried to a position suitable for packaging.

2. A device constructed in accordance with claim 1, wherein a parting device is provided between the first and second conveyor belt systems, said parting device separating a course of baked goods items to thereby permit carrying of rows of the baked goods on each of the conveyor belt systems.

3. A device constructed in accordance with claim 2, wherein the first conveyor system includes a single endless belt, the second conveyor system includes a plurality of endless belts, the endless belt of the first conveyor system being of a width greater than the width of the belts of the second conveyor system, and a further parting device is provided, said parting device separating adjacent endless belts of the second conveyor belt system, whereby single rows of individual baked goods may be carried on the second conveyor belt system and a double row of baked goods may be carried on the first conveyor belt system.

4. A device constructed in accordance with claim 2, wherein the parting device includes a circular blade, the paths of travel of the conveyor belt systems commence at a common shaft, the circular blade being secured to the common shaft and rotating therewith.

5. A device constructed in accordance with claim 1, wherein a shaft is provided, the shaft drivingly engaging the systems, the paths of travel of the systems commencing at the shaft, the means moving the first and second conveyor belt systems including motor means, a power transfer member, the power transfer member being engaged between the motor means and the shaft to thereby rotate the shaft.

6. A device constructed in accordance with claim 1, wherein means is provided to actuate the means moving the endless member, the actuating means including a switch and a trip member, the trip member being positioned within the path of travel of the first conveyor belt system and being actuated by an article of baked goods being carried on the first conveyor belt system.

7. A device constructed in accordance with claim 1, further including a frame, the conveyor belt systems being carried by the frame, the frame including a plurality of wheels, whereby the device may be moved about to facilitate the packaging of baked goods at a variety of work stations within a bakery.

8. A device constructed in accordance with claim 1, wherein the endless member is a chain, a pair of toothed wheels, the chain extending between the toothed wheels, a pair of axles, each of the axles being journaled for rotation along an axis perpendicular to the line of intersection of the planes and each of the wheels being secured to one of the axles.

9. A device constructed in accordance with claim 8, wherein the protuberance is a hook member, the chain being formed of a plurality of links, means hingedly securing adjacent links, the hook being secured to a single link, the hook being arcuately shaped and adapted to engage an article of baked goods without deforming the article.

10. A device constructed in accordance with claim 9, wherein a plurality of protuberances are included, on the chain.

* * * * *